June 24, 1930.   A. C. WOOD ET AL   1,765,710
APPARATUS FOR MANUFACTURING FROZEN CONFECTIONS
Filed Sept. 22, 1927
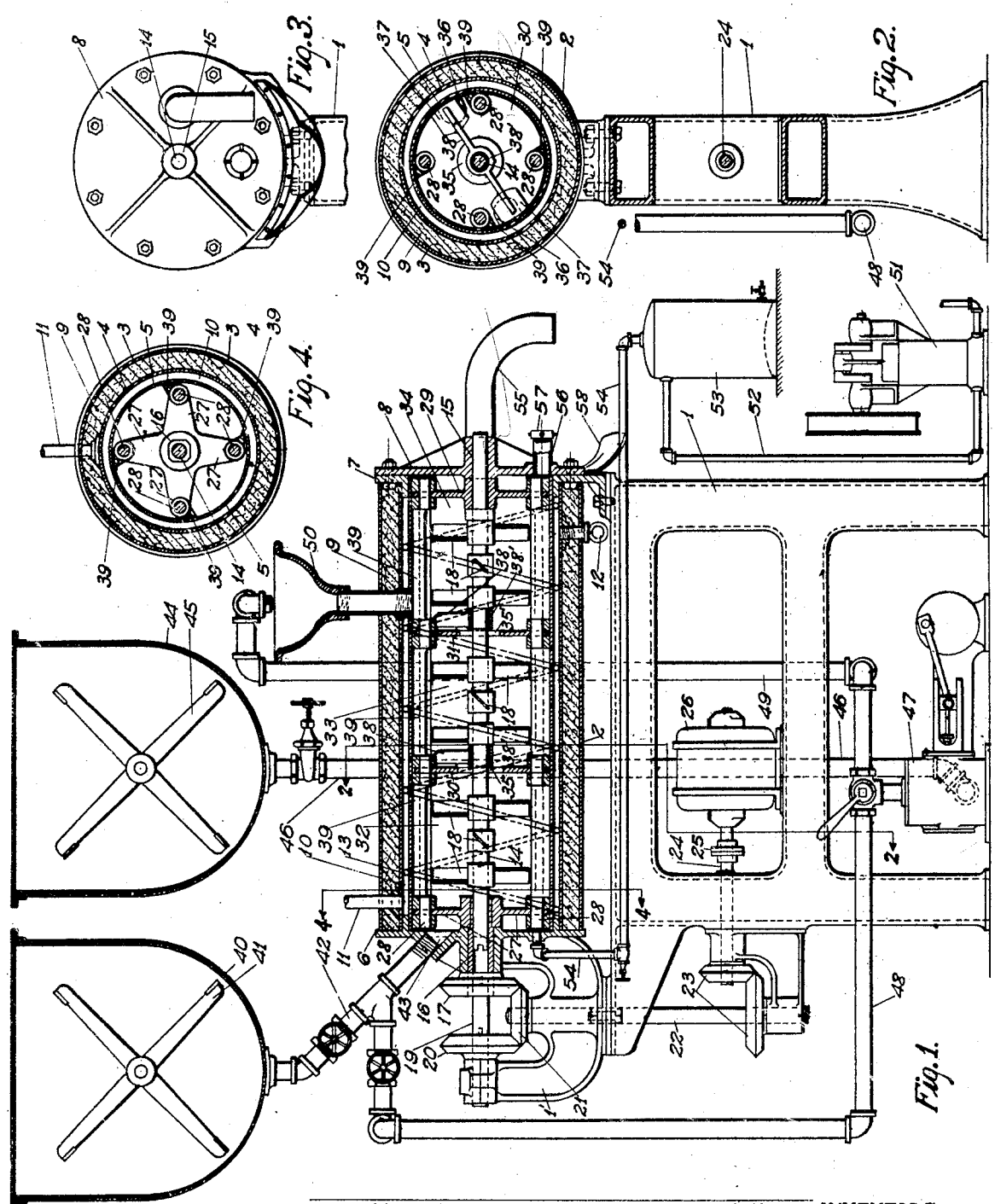
Albert C. Wood and Thomas Hall   INVENTORS.
BY
ATTORNEY.

Patented June 24, 1930

1,765,710

UNITED STATES PATENT OFFICE

ALBERT C. WOOD, OF PHILADELPHIA, AND THOMAS HALL, OF HARRISBURG, PENNSYLVANIA

APPARATUS FOR MANUFACTURING FROZEN CONFECTIONS

Application filed September 22, 1927. Serial No. 221,194.

Our invention is designed to provide an improved method and apparatus for the continuous manufacture of frozen confections, such as ice creams, water ices, frozen custards, and the like, and leading objects of our invention are the control of the volume or "overrun" and the improvement of the flavor of frozen confections produced continuously by means of apparatus of simple, compact and efficient construction.

In accordance with our improvements, the cream or other liquid is fed in regulated quantities to the freezer and worked therethrough in stages in the presence of a suitable gas, such as air or carbon dioxide which is enmeshed in the cooling and thickening fluid by the agitation thereof of suitable beaters. When material in one stage has attained a desired condition it rises and flows into another stage for further treatment, and is preferably flavored by the incorporation of suitable ingredients in the final stage before discharge from the freezer in a semi-solidified condition, particularly where fruit flavorings are used which may be deleteriously affected by excessive beating.

The characteristic features and advantages of our improvements will more fully appear from the following description and the accompanying drawings in illustration thereof.

In the drawings, Fig. 1 is an elevation, partly in section of apparatus embodying our improvements; Fig. 2 is a transverse sectional view thereof on the line 2—2 of Fig. 1, excluding certain external piping; Fig. 3 is an elevation of the discharge end of the freezer; and Fig. 4 is a transverse sectional view of the freezer adjacent to the inlet end thereof on the line 4—4 of Fig. 1.

As illustrated in the drawings, a base 1 supports a freezer 2 preferably comprising spaced concentric cylindrical shells 3, 4 and 5 having at the ends thereof the headers 6 and 7 and the detachable closure 8. The space 9 between the shells 3 and 4 is packed with a suitable non-conductor of heat and the space 10 between the shells 4 and 5 is supplied by the pipe 11 with a suitable refrigerant which is discharged through the pipe 12. The cooling action of the refrigerant is accelerated by circulating the refrigerant more or less rapidly through a helical passage formed between the shells 4 and 5 by a wire or tube 13.

A shaft 14 has one end journalled in a bearing 15 of the closure 8 and its other end journalled in a revoluble sleeve 16 journalled in the head 6 and having a bevel gear 17 fixed thereto. The shaft 14 has fixed thereto the paddles or beaters 18 and is detachably coupled to and revoluble by a shaft 19 journalled in the bracket 1' and in the sleeve 16 and provided with a bevel gear 20. The gears 17 and 20 are revolved in opposite directions by the gear 21 driven by means of the shaft 22, gears 23, shaft 24 and coupling 25 from the electric motor 26 mounted on the frame 1.

The squared end of the sleeve 16 has mounted thereon a spider having radial arms 27 in which are mounted rods 28 having their opposite ends set in arms 29 of a spider journalled on the shaft 14. Disk diaphragms 30 and 31 are carried by the rods 28 and divide the interior of the freezer into zones 32, 33 and 34 normally communicating with one another through axial apertures 35 and 35' in the diaphragms 30 and 31, respectively, the aperture 35' being slightly smaller in diameter than the aperture 35. The flow of ingredients from one compartment to another may be further controlled if desired by placing the freezer in an inclined position with its discharge end higher than its inlet end.

The diaphragms are also respectively provided with openings 36 adjacent to the peripheries thereof and controlled by gates 37 having arms 38 fixed to hubs 38' sleeved on the shaft 14. The webs of the arms 38 form wings which are acted upon by the contents of the freezer to cause the gates to cover or uncover the openings 36, depending upon the direction of rotation of the diaphragms.

Paddles or scrapers 39 are sleeved on the rods 28 between the arms 27 and disk 30, between the disks 30 and 31, and between the disk 31 and arms 29 and have free edges adapted to scrape congealing cream from the inner surface of the shell 5.

A reservoir 40 containing an agitator 41, communicates with the freezer zone 32 through the valve controlled pipe 42 and inlet 43 in the header 6. A reservoir 44, containing an agitator 45, is connected by a valve controlled pipe 46 with a pump 47 which communicates through a valve controlled pipe 48 with the pipe 42, and also communicates through a pipe 49 with a funnel 50 discharging to the zone 34 of the freezer, a three-way cock being provided in the discharge connection from the pump to divert the flow into pipe 48 or pipe 49 as desired.

A compressor 51 is connected by piping 52 with a tank 53, which discharges through a valve controlled pipe 54, into the zone 32 of the freezer.

The zone 34 of the freezer discharges through a spout 55 entering the head 8 at approximately the level of, but offset laterally from, the shaft 14. A drain pipe 56 passing through the header 8 at the bottom of the zone 34 is closed by a detachable cap 57 and may be used to drain the freezer. An apron 58 may be fixed to the front of the freezer.

In the practice of our invention, the liquid "mix" is agitated in the reservoir 40 by the rotation of the agitator 41 and fed to the freezer zone 32 where it is chilled and whipped into thin sheets by oppositely rotating beaters 18 and 39 primarily to condition it for aeration or enmeshment of the gas or air supplied under pressure in regulated quantities from the pipe 54. Any excess of gas may be vented from the opposite end of the freezer. When the "mix" in the chamber 32 reaches the level of the open passage 35, the upper portion of the mix flows through the passage into the chamber 33 and the supply from the reservoir 40 is regulated to such a rate as will maintain a level in the freezer only sufficient to cause a flow of the material in process of freezing from one stage to another. The bulk of the aerating of the mix is done by the rapidly rotating beaters in the chamber 33, from which the lighter portion of the mix flows through the passage 35' into the chamber 34. Fruit flavorings are preferably added to the mix in the chamber 34 to avoid excessive beating thereof in the freezing process. Other flavorings may be added to the mix before its admission to the chamber 32. The reservoir 44 and its complementary parts afford means for supplying flavorings at the desired point. The completely aerated and flavored "mix" rises to the surface in the chamber 34 and flows in semi-solid form from the spout 55. To empty the freezer, the cap 57 may be detached from the drain 56 and the mechanism rotated backward to uncover the apertures 36 and bring one of the apertures of each diaphragm to the bottom of the freezer. To clean the freezer, the closure 8 may be taken off and the entire beating and scraping mechanism removed therewith from the freezer, the diaphragms scraping out any frozen cream ahead of them as they are withdrawn.

Having described our invention, we claim:

1. A freezer containing a plurality of communicating chambers and means movable about an axis for agitating the contents of the respective chambers said chambers communicating adjacent to the axis of said means.

2. A freezer containing a plurality of communicating chambers and means for opening and closing communication between said chambers along the periphery of said chambers.

3. A freezer having partitions forming a plurality of chambers therein opening successively, the one into the other, means for supplying a fluid to one of said chambers, and means for supplying a further fluid to another of said chambers.

4. A freezer having a partition therein dividing it into a plurality of compartments, said partition having an aperture therein permitting communication between said compartments along the periphery thereof, and means for refrigerating the contents of said compartments.

5. A freezer having a partition therein dividing it into a plurality of compartments, means for refrigerating the contents of the freezer, said partition having a central aperture therein permitting flow from one to another of said compartments.

6. A freezer having an apertured partition therein, said freezer and partition being relatively revoluble, and a gate controlling the aperture of said partition.

7. A freezer having therein a revoluble frame provided with beaters, and a diaphragm carried by said frame dividing said freezer into a plurality of compartments.

8. A freezer having therein a revoluble shaft provided with beaters, diaphragms carried by said frame, said diaphragms containing apertures, and gates carried by said shaft for controlling said diaphragm apertures.

9. A freezer containing beating mechanism and having an inlet for the admission of fluid adjacent to one end of said freezer and a second inlet for the admission of fluid to said freezer at a point axially remote from said first inlet.

10. A freezer having a detachable closure at an end thereof, a shaft revoluble within said freezer and having beaters connected therewith, a frame revoluble within said freezer and having beaters connected therewith, and detachable driving means connected with said shaft and frame at the ends thereof remote from said closure, said shaft and frame being removable from said freezer when said closure is detached therefrom.

11. A freezer containing beating mechanism, a reservoir connected with the interior of said freezer, a second reservoir connected with the interior of said freezer at a point remote from the inlet from said first reservoir, and a by-pass for mingling fluid flowing from said second reservoir to said freezer with fluid flowing from said first reservoir to said freezer.

12. A freezer containing beating mechanism, means for delivering a constant supply of liquid to said freezer, means for segregating the frozen portion of the contents of said freezer from the liquid portion thereof, means for introducing flavoring into said segregated frozen portion and means for continuously discharging said frozen portion.

13. A freezer containing beating mechanism, means for delivering a supply of liquid to said freezer during the operation of said beating mechanism, means for segregating the frozen portion of the contents of said freezer from the liquid portion thereof, means for supplying flavoring to said frozen portion during the operation of said beating mechanism, and means for discharging the mixed frozen portion and flavoring from said freezer.

14. A freezer containing agitators, means for supplying liquid to said freezer, means for supplying gas under pressure to said freezer, means for segregating frozen material impregnated with said gas from the liquid contents of said freezer, and means for continuously discharging said impregnated material from said freezer.

15. A freezer comprising a shell, a shaft journalled in said shell and having beaters thereon, a frame revoluble on said axis and provided with scrapers, partitions carried by said frame and containing apertures adjacent to the center and periphery thereof, winged gates revoluble on said shaft for controlling apertures of said partitions, means for supplying liquid to a compartment of said freezer formed by one of said partitions, means for supplying gas to said freezer, means for supplying flavoring to a compartment of said freezer formed by a second partition, and an outlet from said compartment last named.

In witness whereof we have hereunto set our names this 17th day of September, 1927.

ALBERT C. WOOD.
THOMAS HALL.